(12) United States Patent
Komoriyama et al.

(10) Patent No.: US 12,462,960 B2
(45) Date of Patent: Nov. 4, 2025

(54) SEMICONDUCTOR DEVICE, CONTROL DEVICE FOR TRANSMISSION, AND CONTROL METHOD OF ELECTRONIC CONTROL UNIT

(71) Applicant: Hitachi Astemo, Ltd., Hitachinaka (JP)

(72) Inventors: Keishi Komoriyama, Hitachinaka (JP); Yoichiro Kobayashi, Hitachinaka (JP); Minoru Migita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 128 days.

(21) Appl. No.: 18/279,421

(22) PCT Filed: Sep. 10, 2021

(86) PCT No.: PCT/JP2021/033310
§ 371 (c)(1),
(2) Date: Aug. 30, 2023

(87) PCT Pub. No.: WO2022/208933
PCT Pub. Date: Oct. 6, 2022

(65) Prior Publication Data
US 2024/0186046 A1    Jun. 6, 2024

(30) Foreign Application Priority Data
Mar. 30, 2021    (JP) ................................ 2021-057067

(51) Int. Cl.
*H01H 47/00*    (2006.01)
*F16H 61/12*    (2010.01)
(Continued)

(52) U.S. Cl.
CPC ............. *H01F 7/064* (2013.01); *F16H 61/12* (2013.01); *H02M 3/16* (2013.01); *F16H 2061/1232* (2013.01); *F16H 2061/1292* (2013.01)

(58) Field of Classification Search
None
See application file for complete search history.

(56) References Cited

U.S. PATENT DOCUMENTS 5,341,279 A * 8/1994 Yamada .................. H02M 1/36
363/21.04
6,611,436 B2 * 8/2003 Nishida ............. H02M 3/33561
323/267
(Continued)

FOREIGN PATENT DOCUMENTS

JP    2001-245489 A    9/2001
JP    2009-015380 A    1/2009
(Continued)

OTHER PUBLICATIONS

International Search Report, PCT/JP2021/033310, Nov. 9, 2021.

*Primary Examiner* — Stephen W Jackson
(74) *Attorney, Agent, or Firm* — Volpe Koenig (57) ABSTRACT

There is provided a power saving and highly reliable semiconductor device on which a switching power supply circuit and a driver circuit are mounted together, and which can perform appropriate control by the driver circuit even when a battery terminal is disconnected while reducing power loss in the entire semiconductor device. The semiconductor device includes: a first terminal which is connected to a battery power source; a switching power supply circuit which steps down a battery voltage input from the first terminal; a second terminal which is connected to a switching power source different from the battery power source; a regulator circuit which steps down a voltage input from the (Continued)

second terminal; and a predriver circuit which is connected to the regulator circuit.

11 Claims, 6 Drawing Sheets

(51) Int. Cl.
*H01F 7/06* (2006.01)
*H02M 3/16* (2006.01)

(56) References Cited

U.S. PATENT DOCUMENTS

| | | | |
|---|---|---|---|
| 9,407,153 B2* | 8/2016 | Yamane | H02M 3/33523 |
| 2005/0237037 A1* | 10/2005 | Xing | H02M 3/156 |
| | | | 323/268 |
| 2022/0311346 A1* | 9/2022 | Watanabe | H02M 3/33569 |

FOREIGN PATENT DOCUMENTS

| | | |
|---|---|---|
| JP | 2013-156874 A | 8/2013 |
| WO | 2020/179250 A1 | 9/2020 |

* cited by examiner

SEMICONDUCTOR DEVICE, CONTROL DEVICE FOR TRANSMISSION, AND CONTROL METHOD OF ELECTRONIC CONTROL UNIT

TECHNICAL FIELD

The present invention relates to a configuration of a semiconductor device and control thereof, and particularly relates to a technique effective for application to a semiconductor device mounted on an in-vehicle electronic control unit which is required to achieve power saving and miniaturization and weight reduction.

BACKGROUND ART

Enforcement of environmental regulations of cars demand more efficiency of train systems. On the other hand, to realize more advanced electronic control, Electronic Control Units (ECUs), sensors, and actuators mounted on a powertrain system continue to increase, the system becomes more complicated, and miniaturization and weight reduction are also important issues.

An electronic control unit mounted on a car includes, for example, a load driving device which is mounted thereon, and drives an actuator (load) such as a solenoid valve by a semiconductor element using a battery voltage.

Related art of the technical field of the present invention is, for example, a technique as disclosed in PTL 1. PTL 1 discloses that "[t]he first buck regulator 11 is a linear regulator which generates a stabilized voltage of DC 12 V from a battery voltage, and is an in-vehicle power supply device to which a speaker, an audio amplifier, and the like are connected as the high voltage side loads 30" (e.g., FIG. 3 and paragraph of PTL 1).

CITATION LIST

Patent Literature

PTL 1: JP 2009-15380 A

SUMMARY OF INVENTION

Technical Problem

The device described in above PTL 1 is configured to suppress power consumption when a high voltage side load such as an audio amplifier is not used, yet operate an amplifier, other drivers, and the like at a voltage (which is, for example, same 12 V as a battery voltage) for driving the load at a time of an operation.

Although such a configuration generally uses, as an amplifier circuit, for example, an Integrated Circuit (IC) formed on a semiconductor chip, all of these integrated circuits operate by consuming power supplied at 12 V.

By the way, a portion of an electronic circuit constituting an amplifier or the like which needs a high voltage such as 12 V may be actually only an output portion for driving a load. A low voltage such as 5 V may be sufficient for a reference current source, a voltage source, an interface unit for receiving an input signal, or the like which is essential for causing other amplifier circuits to operate in some cases, and a circuit unit which can operate at a low voltage has wastefully lost power.

That is, in a case of the same consumption current, an operation performed at 12 V needs power consumption which is 2.4 times compared to a case of an operation performed at 5 V.

Such wasteful power consumption becomes more remarkable particularly as amplifiers, other drivers, and the like for driving a load have more advanced functions. This is because, in a case where, for example, an amplifier or a driver circuit has a function of detecting an amount of an analog current output to a load, an analog circuit for current detection or the like is added in addition to the above components. Furthermore, this loss is consumed as heat, and therefore there is a problem that a heat dissipation structure becomes excessively large.

Furthermore, for example, in a control device for a transmission includes a solenoid valve and a solenoid driver as high voltage side loads. Generally, a hydraulic circuit performs engagement of gears, adjustment of a pulley width of a continuously variable transmission, and the like for mechanical parts of a transmission, and the solenoid valve is used to control a hydraulic pressure of the hydraulic circuit. Furthermore, the solenoid driver controls the solenoid valve by a current output.

Therefore, output control of the solenoid driver is directly related to control of a transmission ratio. Furthermore, as a low voltage side load, a microcomputer is used as a dedicated semiconductor chip to obtain an output current amount of the solenoid driver by calculating an optimal gear ratio from a vehicle speed, an engine rotational speed, and the like.

When, for example, a power supply voltage falls below an operation guaranteed range of the microcomputer due to disconnection of a battery terminal or the like, such a control device for a transmission has no option but to force the microcomputer to reset to prevent the solenoid driver output from becoming indefinite. Although the solenoid driver output is immediately cut off as the microcomputer is reset at this time, safety measures are taken to, for example, fix a certain transmission ratio by a mechanical fail safe function of the hydraulic circuit to prevent a vehicle from being unable to travel. However, a rapid change in the transmission ratio may cause a transmission shock.

It is therefore an object of the present invention to provide a power saving and highly reliable semiconductor device on which a switching power supply circuit and a driver circuit are mounted together, and which can perform appropriate control by the driver circuit even when a battery terminal is disconnected while reducing power loss in the entire semiconductor device, a control device for a transmission which uses the semiconductor device, and a control method of an electronic control unit.

Solution to Problem

In order to solve the above problems, the present invention includes: a first terminal which is connected to a battery power source; a switching power supply circuit which steps down a battery voltage input from the first terminal; a second terminal which is connected to a switching power source different from the battery power source; a regulator circuit which steps down a voltage input from the second terminal; and a predriver circuit which is connected to the regulator circuit.

Furthermore, the present invention is a control device for a transmission which uses the above semiconductor device, and the predriver circuit controls driving of an electromagnetic coil of the transmission.

Furthermore, the present invention is a control method of an electronic control unit which includes a semiconductor device which is mounted thereon and on which a switching power supply circuit and a driver circuit are mounted together, and the driver circuit is controlled by output power of the switching power supply circuit.

Advantageous Effects of Invention

According to the present invention, it is possible to realize a power saving and highly reliable semiconductor device on which a switching power supply circuit and a driver circuit are mounted together, and which can perform appropriate control by the driver circuit even when a battery terminal is disconnected while reducing power loss in the entire semiconductor device, a control device for a transmission which uses the semiconductor device, and a control method of an electronic control unit.

This can contribute to power saving, miniaturization and weight reduction, and high reliability of the in-vehicle electronic control unit.

Problems, configurations, and effects other than the above problem, configuration, and effect will be made apparent from the following embodiments.

DESCRIPTION OF EMBODIMENTS

Embodiments of the present invention will be described below with reference to the drawings. Note, the same components in the drawings will be assigned the same reference numerals, and the detailed description of overlapping components will be omitted.

First Embodiment

Figure 1:
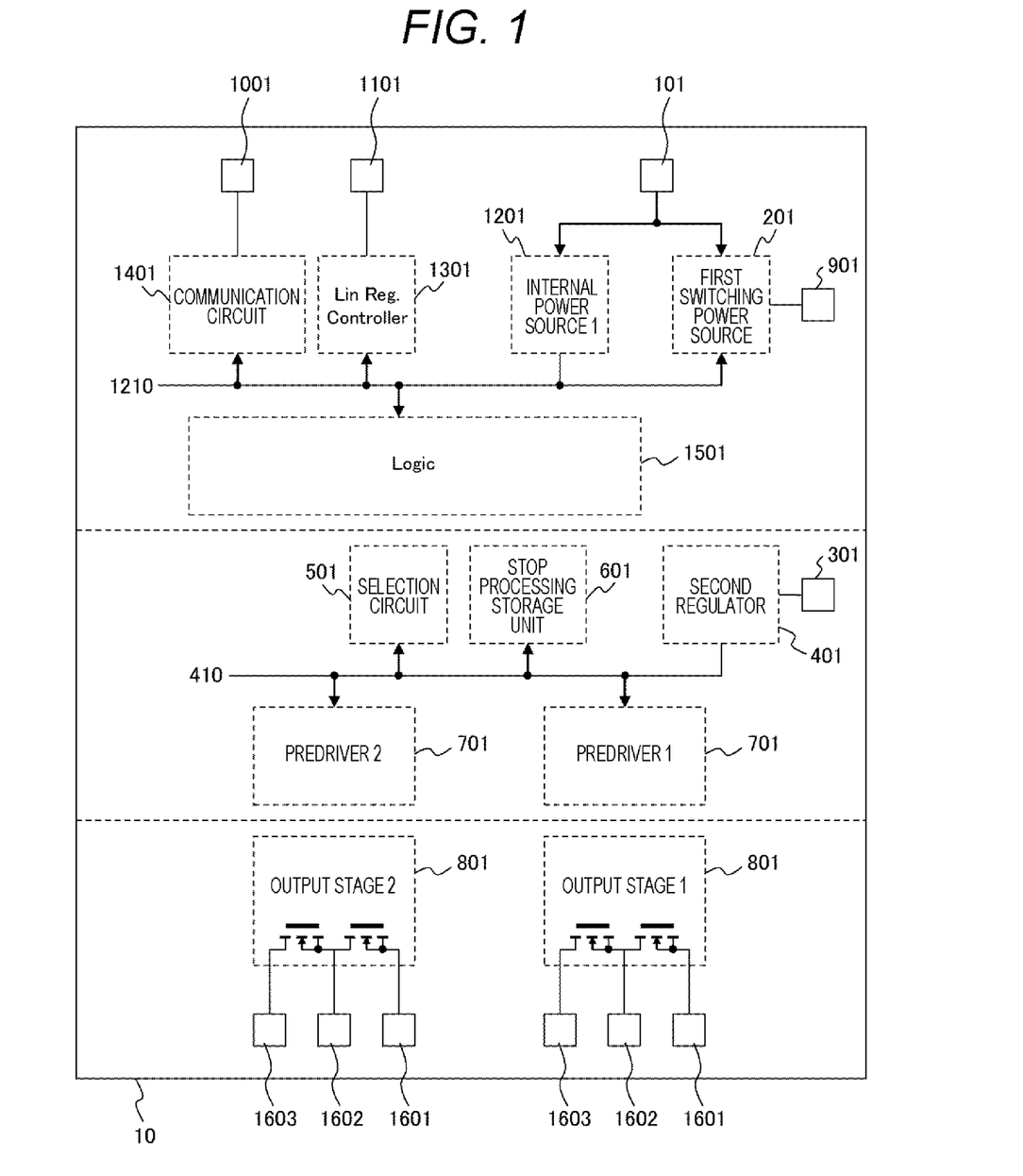
FIG. 1 is a view illustrating a schematic configuration of a semiconductor device according to a first embodiment of the present invention.
Figure 2:
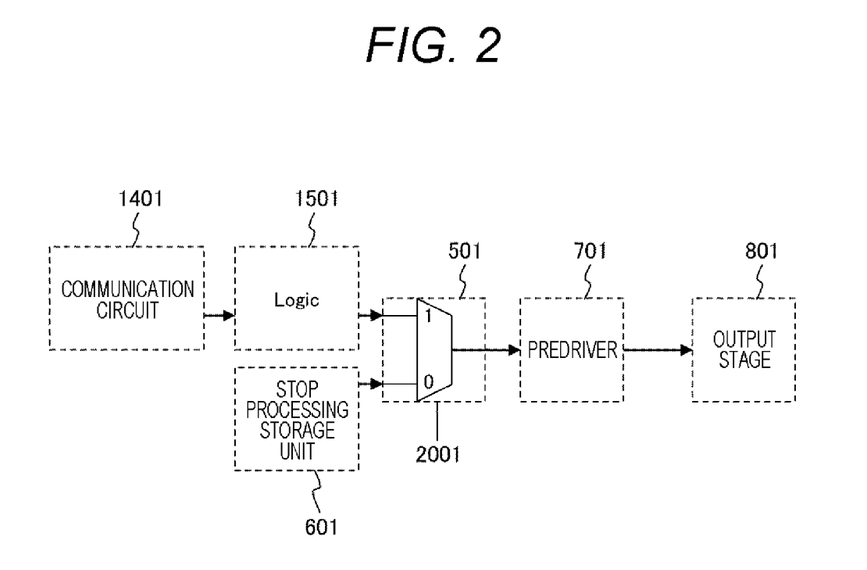
FIG. 2 is a view illustrating a schematic configuration of a selection circuit in FIG. 1.
Figure 3:
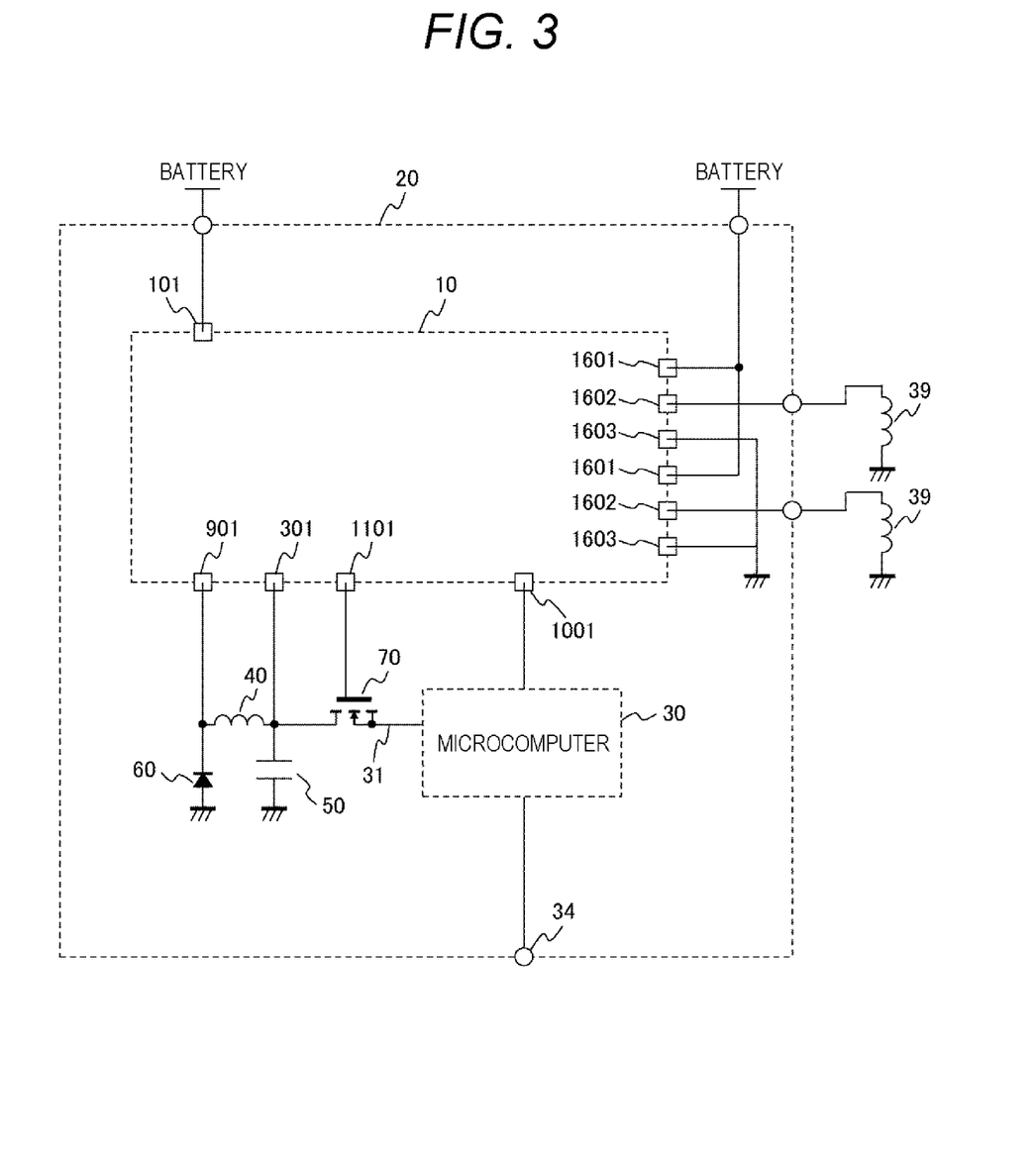
FIG. 3 is a view illustrating a schematic configuration of a control device for a transmission according to the first embodiment of the present invention.
Figure 4:
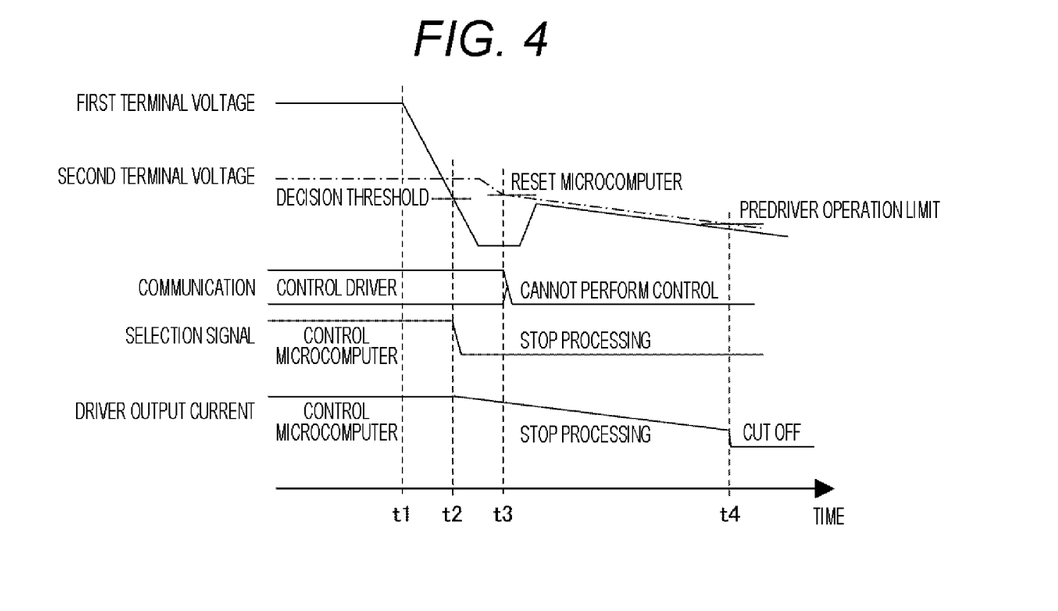
FIG. 4 is a timing chart illustrating a selection switching operation when a first terminal is disconnected according to the first embodiment of the present invention.

A semiconductor device according to a first embodiment of the present invention, a control device for a transmission which uses the semiconductor device, and a control method of an electronic control unit will be described with reference to FIGS. 1 to 4. FIG. 1 is a view illustrating a schematic configuration of the semiconductor device according to the present embodiment. FIG. 2 is a view illustrating a schematic configuration of a selection circuit of FIG. 1. FIG. 3 is a view illustrating a schematic configuration of the control device for the transmission according to the present embodiment. FIG. 4 is a timing chart illustrating a selection switching operation when a first terminal is disconnected according to the present embodiment.

As illustrated in FIG. 1, a semiconductor device 10 according to the present embodiment includes a first switching power source 201, a driver output (an output stage 1 and an output stage 2) 801, a communication circuit 1401, and a regulator control circuit 1301 as input/output blocks for peripherals, and further includes an internal power source 1 (1201), a logic 1501, a second regulator 401, a predriver (a predriver 1 and a predriver 2) 701, a selection circuit 501, and a stop processing storage unit 601 in order to operate these.

The first switching power source 201 is a power switch of a switching type regulator circuit, and controls conduction and non-conduction between a first terminal 101 and a switching output terminal 901.

The communication circuit 1401 is a circuit which communicates with an outside of the semiconductor device 10, and includes a communication terminal 1001.

The regulator control circuit 1301 is a linear regulator to which an FET is externally attached, and includes a regulator control terminal 1101 of an external FET.

The logic 1501 can hold setting values of various blocks at a time of a normal operation, and distribute an input signal from the outside to each block via the communication circuit 1401.

The internal power source 1 (1201) is a regulator circuit which steps down a voltage of the first terminal 101 and generates an internal power source of a low voltage such as 5 V, and supplies power to the first switching power source 201, the communication circuit 1401, the regulator control circuit 1301, and the logic 1501 via an internal power supply wiring 1210.

The driver output (the output stage 1 and the output stage 2) 801 is an output stage of a solenoid driver for supplying a current to the solenoid valve, and can exclusively control and cut off conduction both between a driver output Hi terminal 1601 and a driver output terminal 1602 and between a driver output Lo terminal 1603 and the driver output terminal 1602.

The predriver (the predriver 1 and the predriver 2) 701 is a circuit unit for controlling conduction of the driver output (the output stage 1 and the output stage 2) 801 and detecting an output, and is a circuit unit which can operate at a voltage lower than that of the driver output (the output stage 1 and the output stage 2) 801.

The stop processing storage unit 601 is a block which stores stop processing at a time when an abnormality occurs. According to the stop processing, a cutoff order is determined in a case where, for example, a current output current amount is decreased stepwise, or in a case where there are a plurality of driver outputs.

The second regulator 401 is a regulator circuit which steps down a voltage of a second terminal 301 and generates an internal power source of a low voltage such as 5 V, and supplies power to the predriver (the predriver 1 and the predriver 2) 701, the selection circuit 501, and the stop processing storage unit 601 via the internal power supply wiring 410.

Hereinafter, the selection circuit 501 will be described with reference to FIG. 2.

The selection circuit 501 is a selection circuit for connecting one of the logic 1501 and the stop processing storage unit 601 with the predriver 701 by a selection signal 2001.

For example, when the selection signal 2001 is at a Lo level, an input signal from the communication circuit 1401 to a driver via the logic 1501 is transmitted to the predriver 701, and the driver output (output stage) 801 is controlled. Conversely, when the selection signal 2001 is at a Hi level, processing stored in the stop processing storage unit 601 is sequentially input to the predriver 701, and the driver output (output stage) 801 is controlled.

In this regard, the selection signal 2001 is, for example, a voltage of the first terminal 101.

Next, a control device 20 for a transmission will be described as an example of a control device which uses the semiconductor device 10 according to the present embodiment with reference to FIG. 3.

The control device 20 for the transmission includes the above-described semiconductor device 10 and a microcomputer 30. Furthermore, the control device 20 for the transmission includes an inductance element L (40), a diode D (60), and a capacitor C (50) as elements which constitute the switching power source. Furthermore, the control device 20 for the transmission includes an FET (70) as an element which constitutes the linear regulator. Furthermore, the predriver 701 of the semiconductor device 10 controls driving of an electromagnetic coil (solenoid valve 39) of the transmission.

The first terminal 101 is connected to a battery, and receives a supply of a voltage of 12 V from the battery. The second terminal 301 is connected with an output voltage of the step-down switching power source.

Hereinafter, the output voltage of the switching power source is set to a value such as 6 V.

A power source of the microcomputer 30 is, for example, 5 V, and is supplied via the FET (70) controlled by the regulator control terminal 1101.

The driver output Hi terminal 1601 receives a supply of a voltage from the battery, the driver output Lo terminal 1603 is connected with a ground potential, and the driver output terminal 1602 is connected with the solenoid valve 39.

The semiconductor device 10 receives a control signal from the microcomputer 30 via the communication terminal 1001, and, in a normal state, the microcomputer 30 outputs drive power from the driver output terminal 1602 based on information such as a vehicle speed and an engine rotational speed received via the I/O (34) to control the solenoid valve 39.

Next, an operation in a case where the first terminal 101 causes a disconnection failure in the above configuration will be described with reference to FIG. 4.

A case is assumed in FIG. 4 where the first terminal 101 is disconnected at a time t1.

Until the time t1, the first terminal 101 receives a supply of the battery voltage, and therefore the selection signal 2001 is at the Hi level, and the driver output current is controlled by a communication signal from the microcomputer 30.

When the disconnection occurs at the time t1, the voltage of the first terminal 101 is extracted by an operation of the switching power source operation, and lowers.

At a time t2, at a point of time when the voltage of the first terminal 101 falls below a decision threshold of the selection circuit 501, the selection circuit 501 is switched to the stop processing storage unit 601, and starts stop processing. Furthermore, due to the diode D (60) and an LC filter (the inductance element L (40) and the capacitor C (50)) of the switching power source, the output voltage of the switching power source, that is, the voltage of the second terminal 301 starts lowering after the voltage of the first terminal 101 lowers.

At a time t3, the microcomputer 30 is placed in a reset state accompanying the decrease in a switching power source output. At this time, stop processing of a driver output has already started, and the stop processing continues. Furthermore, a consumption current of the microcomputer 30 lowers in the reset state of the microcomputer 30, so that the voltage of the second terminal 301 gradually lowers.

At a time t4, when the voltage of the second terminal 301 falls below an operation lower limit of the second regulator 401, the driver is cut off.

A circuit such as the driver circuit includes a transistor such as a Metal Oxide Semiconductor (MOS) structure or a Bipolar Junction Transistor (BJT) formed on a semiconductor chip, and areas of these elements increase as a withstand voltage is increased. For example, although a structure called a Laterally double Diffused MOS (LDMOS) may be used in the case of a MOS, the LDMOS has an expanded drift region on a drain terminal side and is separated from a gate so as to have a breakdown voltage, needs to be further individually separated with an insulating film, and therefore has a larger area compared to an MOS of the same gate length.

Although the internal power source 1 (1201) connected to the first terminal 101 needs to withstand a battery voltage, and therefore the LDMOS needs to be used therefor, the second regulator 401 connected to the second terminal 301 receives an input of a voltage stepped down by the first switching power source 201, so that it is possible to shorten the drift region compared to the LDMOS used for the internal power source 1 (1201), or use a normal MOS structure.

As described above, the second terminal 301 which receives a supply of the voltage such as approximately 6 V lower than the battery voltage in the semiconductor device 10 causes the driver circuit to operate, so that it is possible to reduce loss of the predriver circuit compared to a case where the first terminal 101 which receives a supply of the battery voltage is used, and reduce an area in this case since the second regulator 401 can be configured with an element having a relatively small area.

Furthermore, even when the first terminal 101 is disconnected, it is possible to perform stop processing to a certain degree.

As described above, the semiconductor device 10 according to the present embodiment includes the first terminal 101 which is connected to the battery power source, the switching power supply circuit (first switching power source 201) which steps down the battery voltage input from the first terminal 101, the second terminal 301 which is connected to the switching power source (the inductance element L (40), the capacitor C (50), and the diode D (60)) different from the battery power source, the regulator circuit (second regulator 401) which steps down the voltage input from the second terminal 301, and the predriver circuit (predriver 701) which is connected to the regulator circuit (second regulator 401).

Furthermore, the semiconductor device 10 includes the logic circuit (logic 1501) which holds a setting value of each block at a time of the normal operation and distributes an input signal from the outside to each block via the communication circuit, the stop processing storage unit 601 which stores the stop processing flow at a time when an abnormality occurs, and the selection circuit 501 which connects one of the logic circuit (logic 1501) and the stop processing storage unit 601 to the predriver circuit (predriver 701) according to the selection signal 2001 from the outside, and, when the voltage of the first terminal 101 falls below a predetermined voltage, the selection circuit 501 stops the predriver circuit (predriver 701) based on the stop processing flow stored in advance in the stop processing storage unit 601.

Furthermore, when the voltage of the first terminal 101 falls below the predetermined voltage, a stop signal for stopping power supply to the microcomputer 30 which controls the semiconductor device 10 is output.

Consequently, in the semiconductor device on which the switching power supply circuit and the driver circuit are mounted together, the driver circuit can perform appropriate control even when the battery terminal is disconnected while reducing power loss in the entire semiconductor device.

Note that, although not illustrated, there may be employed a configuration where an output transistor such as a power transistor may be further mounted together on the semiconductor device 10, and the predriver circuit (predriver 701) controls the output transistor to function as a tracking regulator which outputs both positive and negative voltages of equal absolute values by setting one voltage.

Furthermore, there may be employed a configuration where the output transistor such as the power transistor may be arranged separately from the semiconductor device 10, and the predriver circuit controls driving of an external output transistor.

In either case, it is possible to reduce power loss.

Second Embodiment

Figure 5:
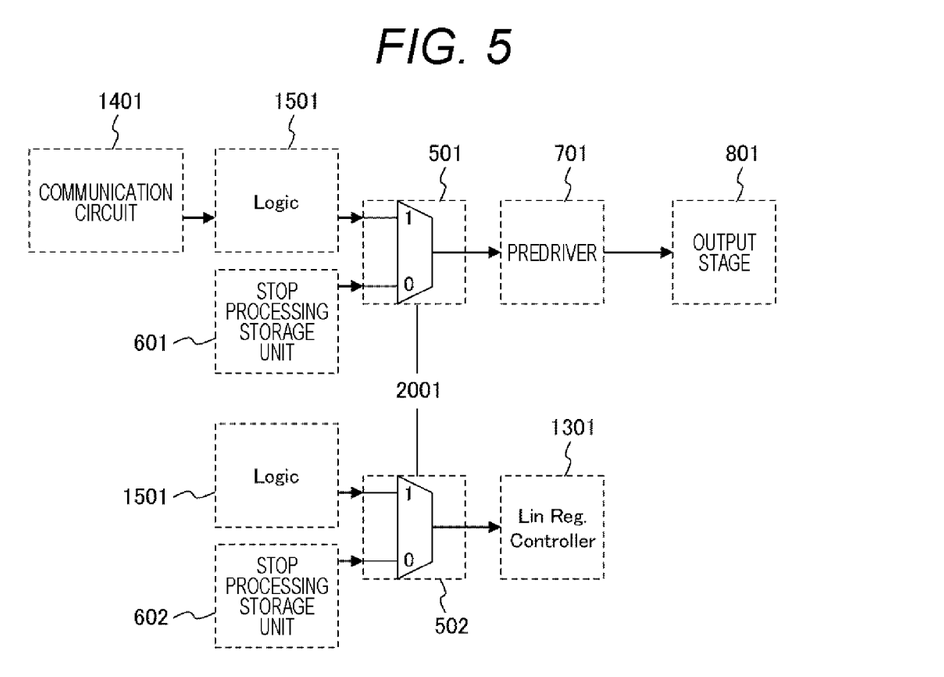
FIG. 5 is a view illustrating a schematic configuration of a selection circuit according to a second embodiment of the present invention.
Figure 6:
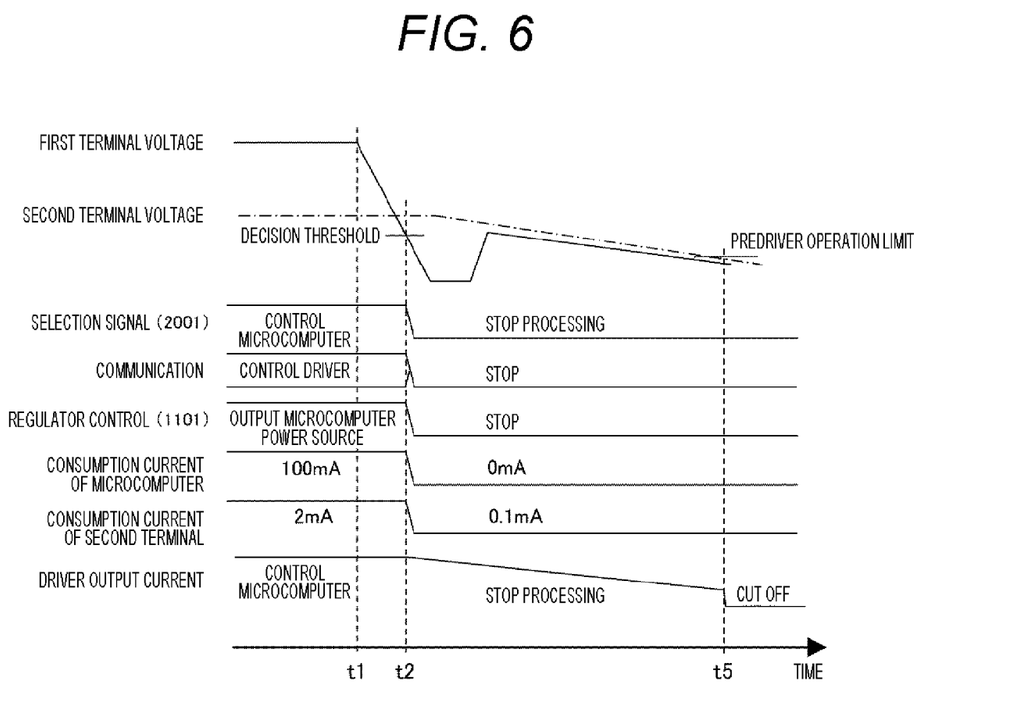
FIG. 6 is a timing chart illustrating a selection switching operation when a first terminal is disconnected according to the second embodiment of the present invention.

A semiconductor device according to a second embodiment of the present invention and a control method of an electronic control unit will be described with reference to FIGS. 5 and 6. FIG. 5 is a view illustrating a schematic configuration of a selection circuit according to the present embodiment. FIG. 6 is a timing chart illustrating a selection switching operation at a time when a first terminal is disconnected according to the present embodiment.

As illustrated in FIG. 5, in addition to a configuration of a selection circuit according to the first embodiment (FIG. 2), the selection circuit according to the present embodiment further includes a selection circuit 502 which switches start/stop of a regulator control circuit 1301, and a stop processing storage unit 602 for stopping the regulator control circuit 1301.

When a selection signal 2001 is Hi, a logic 1501 performs activation/stop processing, and, and, when the selection signal 2001 is Lo, the selection circuit 502 stops according to the stop processing storage unit 602.

An operation in a case where a first terminal 101 causes a disconnection failure in the above configuration will be described with reference to FIG. 6.

It is assumed in FIG. 6 that the first terminal 101 is disconnected at a time t1.

Until the time t1, the first terminal 101 receives a supply of a battery voltage, and therefore the selection signal 2001 is at the Hi level, and a driver output current is controlled by a communication signal from a microcomputer 30. Furthermore, a regulator control terminal 1101 controls an FET (70) to supply power to the microcomputer 30, and a microcomputer consumption current at this time takes a value such as 100 mA. Furthermore, to supply power to a predriver 701, current consumption of a second terminal 301 takes a value such as 2 mA.

When the disconnection occurs at the time t1, the voltage of the first terminal 101 is extracted by an operation of the switching power source operation, and lowers.

At a time t2, at a point of time when the voltage of the first terminal 101 falls below a decision threshold of the selection circuit 501, selection circuits 501 and 502 are switched to stop processing storage units 601 and 602, respectively, and start stop processing. At this time, it is possible to completely cut off a consumption current of the microcomputer 30 by stopping the regulator control terminal 1101 and cutting off the FET (70).

Furthermore, it is possible to suppress the consumption current of the second terminal 301 by stopping a functional block unnecessary for the stop processing of the driver. As a result, a voltage of the second terminal 301 lowers more moderately.

At a time t5, when the voltage of the second terminal 301 falls below an operation lower limit of the second regulator 401, the driver is cut off.

Here, a voltage drop rate of the second terminal 301 from the times t2 to t5 is determined based on the consumption currents of a capacitor C (50) and the second terminal 301, and, when the consumption current of the second terminal 301 is I and a capacitance value of the capacitor C (50) is C, $dV/dt = -I/C$ holds.

In a case of, for example, I=0.1 mA and C=100 uF, −1 V/s is obtained. Therefore, when a normal value of the voltage of the second terminal 301 is 6 V and an operation lower limit of a second regulator 401 is 2 V in this example, a grace period of approximately 4 seconds is obtained before complete cut-off.

As described above, it is possible to suppress a current consumed during the stop processing to the minimum necessary, and consequently increase a grace period time of the stop processing.

As described above, the semiconductor device 10 according to the present embodiment includes another regulator circuit (regulator control circuit 1301) which is different from the second regulator 401, the another selection circuit 502 which is different from the selection circuit 501, and the stop processing storage unit 602 which is different from the stop processing storage unit 601, and, when the voltage of the first terminal 101 falls below the predetermined voltage, the selection circuit 502 stops the regulator control circuit 1301 based on the stop processing flow stored in advance in the stop processing storage unit 602.

Third Embodiment

Figure 7:
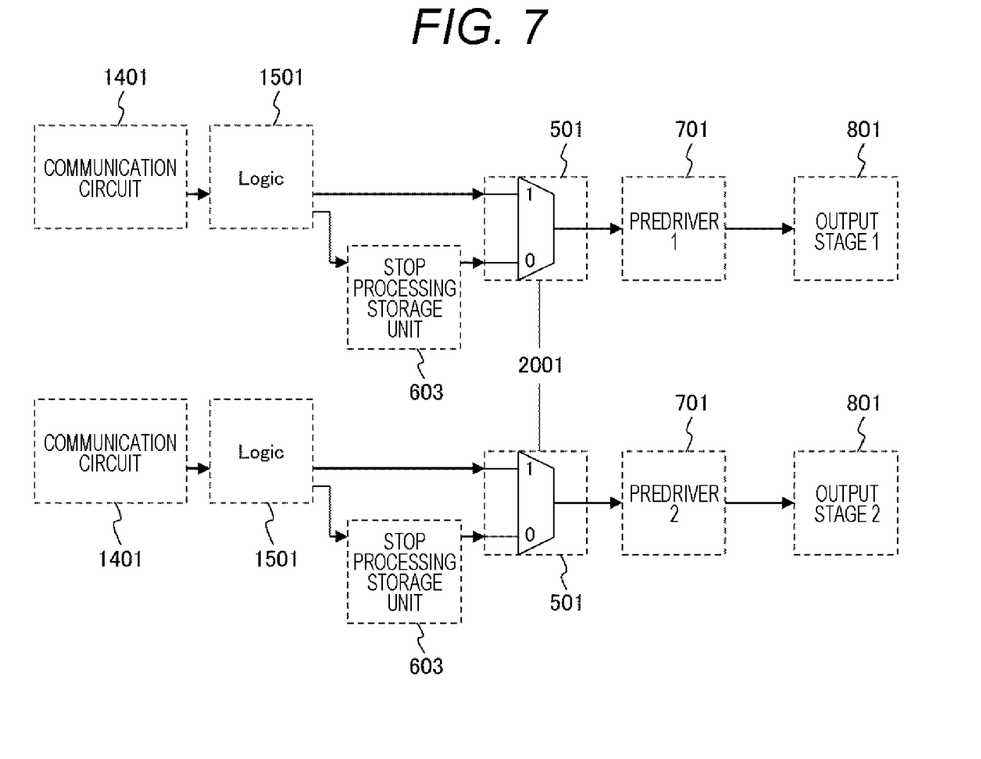
FIG. 7 is a view illustrating a schematic configuration of a selection circuit according to a third embodiment of the present invention.
Figure 8:
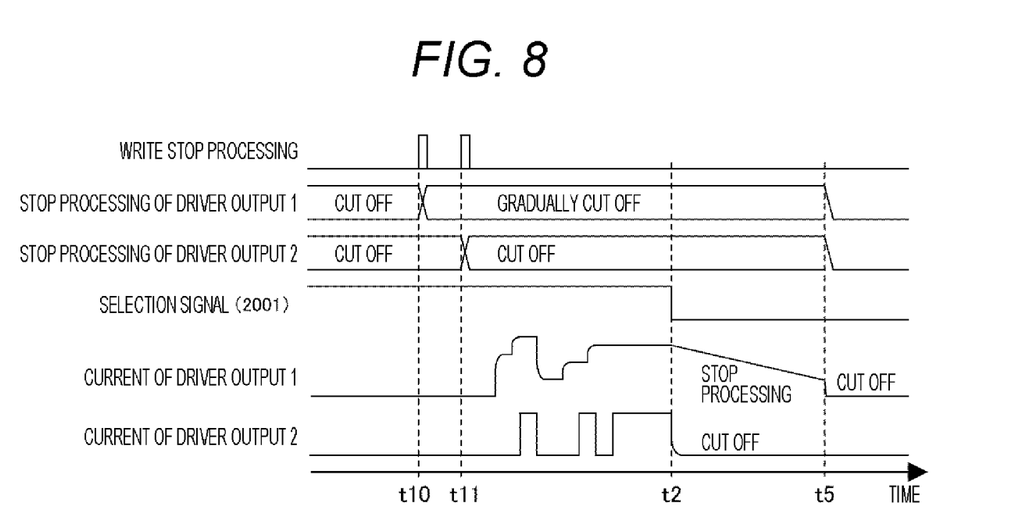
FIG. 8 is a timing chart illustrating a rewriting operation of stop processing according to the third embodiment of the present invention.

A semiconductor device according to a third embodiment of the present invention and a control method of an electronic control unit will be described with reference to FIGS. 7 and 8. FIG. 7 is a view illustrating a schematic configuration of a selection circuit according to the present embodiment. FIG. 8 is a timing chart illustrating a stop processing rewriting operation according to the present embodiment.

As illustrated in FIG. 7, the selection circuit according to the present embodiment includes a selection circuit 501 and a stop processing storage unit 603 per channel of a driver, and stop processing is configured to be capable of being read and written from an outside by a communication circuit 1401 and a logic 1501.

A setting timing of the stop processing storage unit 603 according to the present embodiment will be described with reference to FIG. 8.

FIG. 8 assumes a control circuit which controls a two-channel driver of driver outputs 1 and 2. In the present embodiment, the driver output 1 is used to drive a linear solenoid valve which controls an output current by a detailed current instruction, and the driver output 2 is used to drive an ON/OFF solenoid valve which performs current drive control by selecting one of two options of ON and OFF. In this example, significance of the driver output 2 lies in whether to cause a current to flow (ON) or cut off the current (OFF), and it is not necessary to control a fine current amount.

After a semiconductor device 10 is started, stop processing of each driver is initially set as immediately "cut off" until a time t10.

At the time t10, contents of stop processing for the driver output 1 is switched to "gradually cut off" via the communication circuit 1401. Furthermore, at a time t11, similarly, contents of stop processing of the driver output 2 is set to "cut off" as is. Thereafter, a normal operation is performed.

When a selection signal 2001 is switched at a time t2, each driver output executes stop processing according to the stop processing of each driver.

By individually rewriting the stop processing of each driver output via the communication circuit 1401 as described above, it is possible to set optimal stop processing for individual drive targets.

Furthermore, the present invention is not limited to the above embodiments, and includes various modified examples. For example, the above embodiments have been described in detail to describe the present invention for ease of understanding, and is not necessarily limited to those including all described components. Furthermore, it is possible to replace part of components of a certain embodiment with components of the other embodiment, and it is also possible to add the components of the other embodiment to the components of the certain embodiment. Furthermore, the other components can be added to, deleted from, or replaced with part of the components of each embodiment.

REFERENCE SIGNS LIST

10 semiconductor device
20 control device for transmission
30 microcomputer
31 microcomputer power source
34 I/O
39 solenoid valve
40 inductance element L
50 capacitor C
60 diode D
70 FET
101 first terminal
201 first switching power source
301 second terminal
401 second regulator
410 power supply wiring (of second regulator output)
501, 502 selection circuit
601 to 603 stop processing storage unit
701 predriver (predriver 1 and predriver 2)
801 driver output (output stage 1 and output stage 2)
901 switching output terminal
1001 communication terminal
1101 regulator control terminal
1201 internal power source 1
1210 power supply wiring
1301 regulator control circuit
1401 communication circuit
1501 logic
1601 driver output Hi terminal
1602 driver output terminal
1603 driver output Lo terminal
2001 selection signal

The invention claimed is:

1. A semiconductor device comprising:
a first terminal that is connected to a battery power source;
a switching power supply circuit that steps down a battery voltage input from the first terminal;
a second terminal that is connected to a switching power source different from the battery power source;
a regulator circuit that steps down a voltage input from the second terminal; and
a predriver circuit that is connected to the regulator circuit.

2. The semiconductor device according to claim 1, further comprising:
a logic circuit that holds a setting value of each block at a time of a normal operation, and distributes an input signal from an outside to the block via a communication circuit;
a stop processing storage unit that stores a stop processing flow at a time when an abnormality occurs; and
a selection circuit that connects one of the logic circuit and the stop processing storage unit to the predriver circuit according to a selection signal from the outside,
wherein, when a voltage of the first terminal falls below a predetermined voltage, the selection circuit stops the predriver circuit based on the stop processing flow stored in advance in the stop processing storage unit.

3. The semiconductor device according to claim 1, wherein the switching power source includes an inductance element, a diode, and a capacitor.

4. The semiconductor device according to claim 1, wherein, when a voltage of the first terminal falls below a predetermined voltage, a stop signal for stopping power supply to a microcomputer that controls the semiconductor device is output.

5. The semiconductor device according to claim 2, wherein the stop processing flow stored in the stop processing storage unit is rewritable by the input signal from the outside via the communication circuit.

6. The semiconductor device according to claim 2, further comprising:
another regulator circuit that is different from the regulator circuit;
another selection circuit that is different from the selection circuit; and
a stop processing storage unit that is different from the stop processing storage unit,
wherein, when the voltage of the first terminal falls below the predetermined voltage, the another selection circuit stops the another regulator circuit based on a stop processing flow stored in advance in the another stop processing storage unit.

7. The semiconductor device according to claim 1, further comprising an output transistor,
wherein the predriver circuit is a tracking regulator that controls the output transistor to output both positive and negative voltages of equal absolute values by setting one voltage.

8. The semiconductor device according to claim 1, wherein the predriver circuit is a drive circuit that controls driving of an external output transistor.

9. A control device for a transmission which uses the semiconductor device according to claim 1, wherein the predriver circuit controls driving of an electromagnetic coil of the transmission.

10. A control method of an electronic control unit that includes a semiconductor device that is mounted thereon and on which a switching power supply circuit and a driver circuit are mounted together, the control method comprising:
  controlling the driver circuit by output power of the switching power supply circuit; and
  stopping the driver circuit based on a stop processing flow stored in advance in a stop processing storage unit when an input voltage of the switching power supply circuit falls below a predetermined voltage.

11. A control method of an electronic control unit that includes a semiconductor device that is mounted thereon and on which a switching power supply circuit and a driver circuit are mounted together, the control method comprising:
  controlling the driver circuit by output power of the switching power supply circuit; and
  stopping the driver circuit based on a stop processing flow stored in advance in a stop processing storage unit when an input voltage of the switching power supply circuit falls below a predetermined voltage,
  wherein the driver circuit controls driving of an electromagnetic coil of a transmission.

* * * * *